United States Patent [19]

Betzold et al.

[11] Patent Number: 4,998,136

[45] Date of Patent: Mar. 5, 1991

[54] CONTINUOUS MICROFILMING APPARATUS

[75] Inventors: Wolfram Betzold, Hoehenkirchen; Karl-Heinz Dietrich, Munich; Peter Griessner, Munich; Hans Schepers, Pfaffenhofen, all of Fed. Rep. of Germany

[73] Assignee: Agfa-Gevaert Aktiengesellschaft Agfa-Gevaert Aktiencesellschaft, Leverkusen, Fed. Rep. of Germany

[21] Appl. No.: 431,921

[22] Filed: Nov. 6, 1989

[30] Foreign Application Priority Data

Nov. 25, 1988 [DE] Fed. Rep. of Germany ....... 3839854

[51] Int. Cl.5 .......................... G03B 27/32; B65H 5/02
[52] U.S. Cl. ......................................... 355/64; 271/275
[58] Field of Search ................. 271/3.1, 275; 355/323, 355/64

[56] References Cited

U.S. PATENT DOCUMENTS

| | | | |
|---|---|---|---|
| 3,856,132 | 12/1974 | Sakurai et al. | 271/275 X |
| 3,970,385 | 7/1976 | Kearney et al. | 355/64 X |
| 4,045,014 | 8/1977 | Karlsson | 271/275 X |
| 4,868,919 | 9/1989 | Tanaka et al. | 355/64 X |

Primary Examiner—Donald A. Griffin
Attorney, Agent, or Firm—Michael J. Striker

[57] ABSTRACT

A continuous microfilming apparatus comprising a filming station, means for feeding documents to be microfilmed to the filming station, means for collecting the documents after they have been filmed, and means for transporting the documents from the filming station to the collecting means and turning the documents over substantially 180° while transporting them, which transporting and turnover means includes a transporting reel defining a turnover path of substantially 180° andd flexible guide means circumscribing the transporting reel substantially over 180° and defining therewith a transporting channel for the documents.

11 Claims, 3 Drawing Sheets

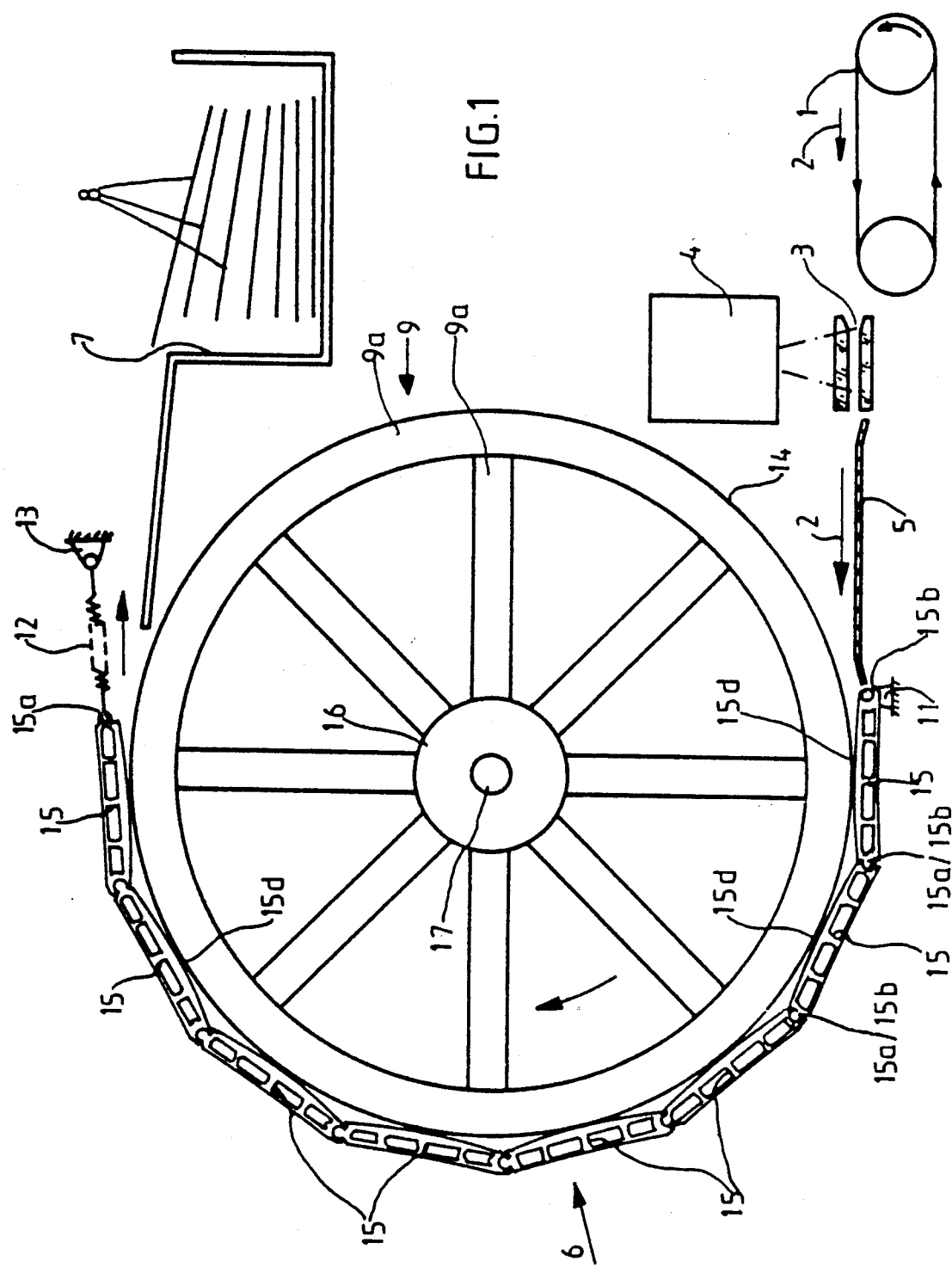

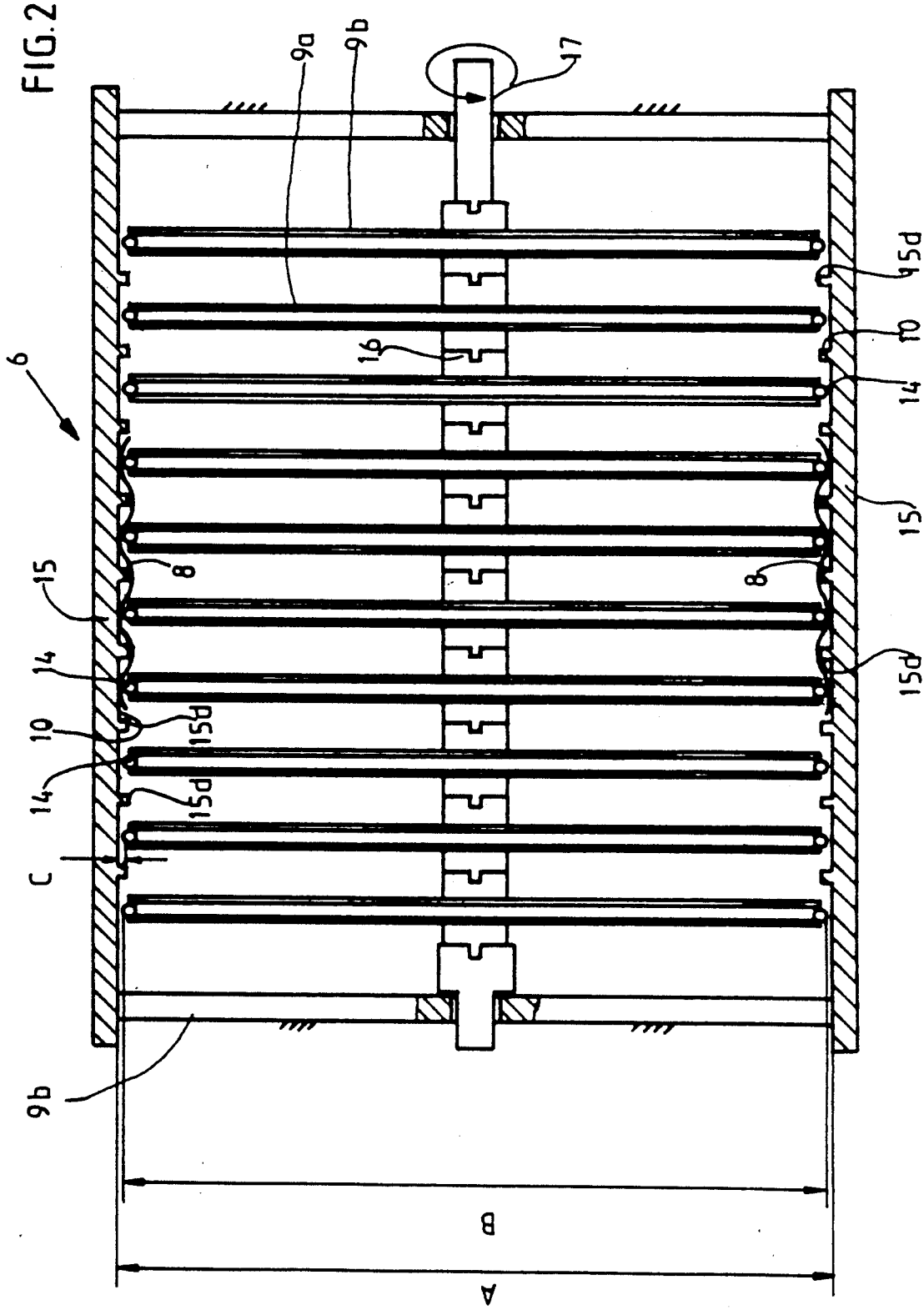

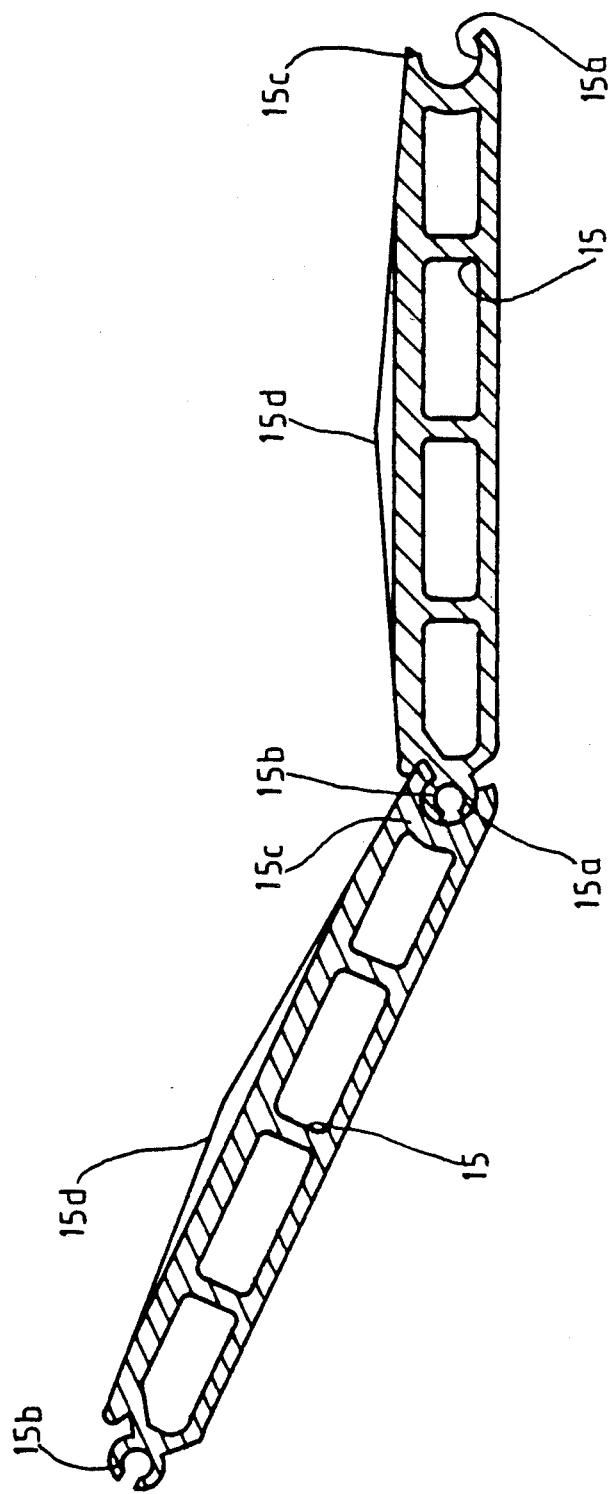

CONTINUOUS MICROFILMING APPARATUS

BACKGROUND OF THE INVENTION

The invention relates to a continuous microfilming apparatus comprising a document feeding device, a filming station, a transporting device that turns documents over about 180°, and a collecting tray located at an end of the transporting device for collecting filmed documents.

Continuous microfilming apparatuses of this kind are available on the market. In such apparatuses, it is important to turn over documents after microfilming to place the documents into the collecting tray or basket in order of their microfilming with proper sides facing in the same direction. In known apparatuses, turnover and transporting of documents from the apparatus is effected by transporting bands spaced from each other or by a row of pairs of transporting carrier rollers. With this known method of transporting and turning over of documents, the documents not only frictionally engage opposite surfaces of respective transporting means but are also subjected to a certain clamping. This leads not only to high transporting forces but also may result, dependent on the type of the document, in tilting of documents, their crumpling, and even their damage.

SUMMARY OF THE INVENTION

The object of the invention is to produce a continuous microfilming apparatus in which tilting, crumpling and even damage of documents having different properties during transporting of the documents by the transporting and turnover means from the filming station and, thereby, any disturbances in operation of the apparatus because of document transport are prevented.

The object of the invention is achieved by providing a transporting device comprising a large transporting reel defining a transporting channel in which the documents are not clamped and are not subjected to different pulling and compressing forces so that crumpling and damage of the documents and, thereby, disturbances in operation of the transporting device is reliably prevented. Forming the transporting reel from a plurality of axially spaced similar wheels having a common drive has the advantage that the documents are transported without friction forces being applied to their whole surface. Providing a flexible guide surface formed as a link chain with projections extending into a space between adjacent wheels of the transporting reel permits to impart to documents a wave shape during their transport. The wave shape of transported documents increases their stiffness and especially prevents the documents from crumpling and tilting.

The present invention both as to its construction and to its mode of operation, together with additional objects and advantages thereof, will be best understood from the following detailed description of the preferred embodiment with reference to the accompanying drawings.

BRIEF DESCRIPTION OF THE DRAWINGS

FIG. 1 shows schematically a side view of a microfilming continuous apparatus with a transporting and turnover device for filmed documents according to the present invention;

FIG. 2 shows a cross-sectional view taken transverse to a transporting direction of the transporting and turnover device shown in FIG. 1; and FIG. 3 shows an enlarged cross-sectional partial view of a guide surface of the transporting and turnover device shown in FIG. 1.

DESCRIPTION OF THE PREFERRED EMBODIMENT

FIG. 1 shows schematically a microfilming continuous apparatus which housing for simplicity sake is not shown and a document feeding device for successively feeding single documents in the direction of arrow 2. The microfilming continuous apparatus comprises a filming station 3 with exposure and filming element 4, a transporting channel 5 for documents, and a turnover device 6 for turning the documents over about 180°. A collecting basket 7 receives filmed documents 8 placed therein in an orderly fashion. Because the filmed documents 8 are turned over 180°, they are placed in the collecting basket 7 in order of their filming and with their inscribed sides facing in the same direction. The turnover path of the transporting and turnover device 6 is formed by a half of the circumference of a transporting reel 9. The transporting reel 9 has an outer surface suitable for carrying due to friction, documents 8 transported by the transporting reel 9.

In the region of the transporting reel 9 in which the documents 8 are turned over, that is in an angular region of about 180°, over the width corresponding to a maximum width of transporting documents, the transporting reel is enclosed with a flexible guide surface 10 only very slightly spaced from the outer surface of the transporting reel. This guide surface 10 is, on the one hand, movably supported on a housing element 11 at one end thereof, and, on the other hand, is attached by a tension spring 12 to a housing element 13 at the other end thereof. The guide surface 10 is, thus, over the entire region over which it surrounds the transporting reel, tensioned in the direction of rotation of the latter. Thereby, the guide surface 10 does not contact the friction surface of the transporting reel 9 and does not clamp the documents 8 which, otherwise, could cause disturbances in transporting of the documents. Stationary circular discs 9b provided at the axial ends of the transporting reel 9 and the transporting path for the documents 8 and outside thereof, insure a clearance between the guide surface 10 and the transporting reel 9 which clearance defines a transporting channel. With the guide surface 10 and the discs 9b being stationary, the documents 8 are transported only over the transporting reel 9 and are carried thereby. The transporting reel 9, i.e., may be formed as a reel with a rubber or plastic coil enclosing it. The guide surface 10 may be formed as a metal or plastic member having a continuous partially cylindrical surface.

According to a preferred especially advantageous embodiment, the transporting reel is formed of a plurality of equally spaced discs or wheels 9a which are fixedly connected to each other for joint rotation. These wheels, according to FIG. 2, have a diameter B. To form a transporting channel, the outer discs 9b have a larger diameter A. As shown in FIG. 2, the wheels 9b have grooves on circumferences thereof for mounting a carrying friction surface thereon. O-shaped friction rings 14 are located in these grooves to form the carrying friction surface. However, instead of O-rings, flat straps glued to the wheels can be used. Generally, any known form of a friction surface can be used. The depth C of the transporting channel equals A/2 minus B/2. This depth must be so selected that a document 8 having a maximum predetermined thickness can be transported by wheels 9a with rings 14. The wheels 9a are supported on a common axle 16 fixedly mounted on a drive shaft 17 for joint rotation therewith. The discs 9b are mounted about the axle 16 or the drive shaft 17 in such a manner that they remain stationary during rotation of the drive shaft 17.

A further particularity of the described embodiment consists in that the guide surface 10 is formed as a link chain comprising a row of identical single links 15 extending over the width of the transporting reel 9 or the total width of wheels 9a. The links are movable relative to each other along their ends extending along the width of the transporting reel 9 or the length of the drive shaft. To facilitate assembly of the link chain, one ends have bearing recesses 15a formed therein, and the other ends are formed as pivotable pin elements 15b extending along respective ends and insertable in the respective bearing recesses. To enable insertion, the ends defining the bearing recesses are formed as bifurcate forks with an arm 15c adjacent to a respective wheel 9a being shorter than the outer arm. As a result, as shown in FIG. 3, a pin element 15b of a respective link 15 can penetrate into the open forked recess 15a of another link 15. Thereby because of shorter arms 15c, the links 15 can be disposed relative to each other at an angle so that they together circumscribe the circumferences of wheels 9a with a predetermined clearance. The first link of the link chain is fixed, and the last link of the link chain is pivotably supported by the spring 12.

The embodiment of the invention described above basically permits to achieve the object of the invention. However, it was found that a further improvement is achieved when the transported documents 8 are transported in a predetermined wave form with wave crests and troughs extending along the width of the transporting reel. This stiffens thin and flexible documents 8 so that they can be transported without disturbances and insures their protection against crumpling and tear. To obtain such a wave form of the documents 8 at their transportation, the links 15 are provided with projections 15d facing the transporting reel 9 or wheels 9a and spaced therefrom. The projections have a triangular or arched profile which impart to the documents 8 passing thereby the required wave form in the circumferential direction of the transporting reel 9 or the wheel 9a along the width thereof. Each of the projections 15d at its most projecting end has a predetermined flatness as shown in FIG. 2.

Naturally, other embodiments of links can be used. For example, the links 15 can be pivotally connected to each other along their ends with hinges, as with window or door hinges, and a pin extending therethrough. Links 15, as shown in FIG. 3, may be formed as hollow profiles because of material and weight considerations. However, this is not compelling.

While the invention has been illustrated and described as embodied in a continuous microfilming apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A continuous microfilming apparatus comprising a filming station; means for feeding documents to be microfilmed to said filming station; means for collecting the documents after they have been filmed; and means for transporting the documents from said filming station to said collecting means and turning the documents over substantially 180° while transporting them, said transporting and turnover means including a transporting reel defining a turnover path of substantially 180° and flexible guide means circumscribing said transporting reel substantially over 180° and defining therewith a transporting channel for the documents, said flexible guide means having a fixedly supported end; and means in said transporting channel for imparting a wave form to the documents transported through said transporting channel.

2. A transporting device for a continuous microfilming apparatus having a filming station, means for feeding documents to be microfilmed to the filming station, and means for collecting the documents after they have been filmed, said transporting device comprising means for transporting the documents from the filming station to the collecting means and turning the documents over substantially 180° while transporting them, said transporting and turning means comprising a transporting reel defining a turnover path of substantially 180°, flexible guide means circumscribing said transporting reel substantially over 180° and defining therewith a transporting channel for the documents, said flexible guide means having a fixedly supported end; and means in said transporting channel for imparting a wave form to the documents transported through said transporting channel.

3. A continuous microfilming apparatus comprising a filming station; means for feeding documents to be microfilmed to said filming station; means for collecting the documents after they have been filmed; and means for transporting the documents from said filming station to said collecting means and turning the documents over substantially 180° while transporting them, said transporting and turnover means including a transporting reel defining a turnover path of substantially 180° and flexible guide means circumscribing said transporting reel substantially over 180° and defining therewith a transporting channel for the documents, said flexible guide means having a fixedly supported end, said transporting reel comprising a plurality of similar axially spaced wheels fixedly attached to each other for joint rotation, each of said plurality of wheels having an outer circumference and a friction surface formed thereon.

4. A continuous microfilming apparatus according to claim 3, wherein each of said plurality of wheels has a groove formed in the outer circumference thereof and a ring made of one of rubber and plastic material, located in said groove and defining said friction surface.

5. A continuous microfilming apparatus comprising a filming station; means for feeding documents to be microfilmed to said filming station; means for collecting the documents after they have been filmed; and means for transporting the documents from said filming station to said collecting means and turning the documents over substantially 180° while transporting them, said transporting and turnover means including a transporting reel defining a turnover path of substantially 180° and flexible guide means circumscribing said transporting reel substantially over 180° and defining therewith a transporting channel for the documents, said flexible guide means having a fixedly supported end, said transporting reel having a predetermined diameter and opposite axial ends, said apparatus further comprising a disc at each of said opposite axial ends, arranged outside the transporting path defined by said transporting reel, and having a diameter larger than the predetermined diameter of said transporting reel for providing a clearance between said guide surface means and said transporting reel.

6. A continuous microfilming apparatus comprising a filming station; means for feeding documents to be microfilmed to said filming station; means for collecting the documents after they have been filmed; and means for transporting the documents from said filming station to said collecting means and turning the documents over substantially 180° while transporting them, said transporting and turnover means including a transporting reel defining a turnover path of substantially 180° and flexible guide means circumscribing said transporting reel substantially over 180° and defining therewith a transporting channel for the documents, said flexible guide means having a fixedly supported end, said transporting reel having a width, and said guide surface means being formed as a link chain including a plurality of single links extending along the width of the transporting reel and having longitudinal ends at which said links are pivotable relative to each other.

7. A continuous microfilming apparatus according to claim 6, further comprising first and second housing portions and an tension spring for attaching said fixedly supported end to one of said first and second housing portions, said link chain having another end movably supported on the other of said first and second housing portions.

8. A continuous microfilming apparatus according to claim 6, wherein each of said links has a similar profile having opposite ends, one of said opposite ends being formed as a bearing recess and the other of said opposite ends being formed as a pivotable pin insertable into a bearing recess of an adjacent link.

9. A continuous microfilming apparatus according to claim 8, wherein said one end is formed as a bifurcate fork defining said bearing recess and having a first arm located adjacent to said transporting reel and having a first length, and a second arm spaced further away from said transporting reel and having a second length greater than the first length, of said first arm.

10. A continuous microfilming apparatus according to claim 6, wherein said transporting reel comprises a plurality of similar axially spaced wheels fixedly attached to each other for joint rotation, each of said links comprising a triangular-shaped projection extending into a space between two adjacent wheels.

11. A continuous microfilming apparatus according to claim 10 wherein said triangular-shaped projection has a flatness at a peak thereof.

* * * * *